(12) United States Patent
Miyamoto et al.

(10) Patent No.: US 6,299,148 B1
(45) Date of Patent: Oct. 9, 2001

(54) LIQUID-FILLED VIBRATION ISOLATOR

(75) Inventors: Yasuo Miyamoto; Hiroshi Tokimoto, both of Saitama; Kunihisa Takko, Kanagawa, all of (JP)

(73) Assignees: Honda Giken Kogyo Kabushiki Kaisha, Tokyo (JP); Hokushin Corporation, Kanagawa (JP)

( * ) Notice: Subject to any disclaimer, the term of this patent is extended or adjusted under 35 U.S.C. 154(b) by 0 days.

(21) Appl. No.: 09/378,726

(22) Filed: Aug. 23, 1999

(30) Foreign Application Priority Data

Aug. 26, 1998 (JP) ................................................ 10-240441

(51) Int. Cl.[7] ................................................................ F16F 5/00
(52) U.S. Cl. ........................................ 267/140.12; 267/293
(58) Field of Search ........................... 267/140.11, 140.12, 267/293, 154, 153, 219, 141.2, 141.7; 280/124.108, 124.109, 124.146, 124.148, 124.161

(56) References Cited

U.S. PATENT DOCUMENTS

| | | | | |
|---|---|---|---|---|
| 3,403,899 | * | 10/1968 | Plume | 267/154 |
| 4,377,216 | * | 3/1983 | Ueno | 267/140.12 |
| 4,705,410 | * | 11/1987 | von Broock | 267/140.12 |
| 4,869,475 | * | 9/1989 | Bouhier | 267/140.12 |
| 4,893,799 | * | 1/1990 | de Fontenay | 267/140.12 |
| 4,944,482 | * | 7/1990 | Bouhier et al. | 267/140.12 |
| 5,024,461 | * | 6/1991 | Miyakawa et al. | 267/140.12 |
| 5,062,654 | * | 11/1991 | Kakimoto et al. | 267/293 |
| 5,080,331 | * | 1/1992 | de Fontenay | 267/140.12 |
| 5,102,108 | * | 4/1992 | Fujinami et al. | 267/219 |
| 5,145,155 | * | 9/1992 | Funahashi et al. | 267/140.12 |
| 5,170,997 | * | 12/1992 | Girard et al. | 267/140.12 |
| 5,181,698 | * | 1/1993 | Fiene et al. | 267/140.12 |
| 5,251,884 | * | 10/1993 | Bouhier | 267/140.12 |
| 5,397,112 | * | 3/1995 | Roth et al. | 267/140.12 |
| 6,007,060 | * | 12/1999 | Vermaerke | 267/140.12 |

* cited by examiner

*Primary Examiner*—Robert J Oberleitner
*Assistant Examiner*—Robert A Siconolfi
(74) *Attorney, Agent, or Firm*—Sughrue, Mion, Zinn, Macpeak & Seas, PLLC

(57) ABSTRACT

A liquid-filled vibration isolator includes: an annular mounting portion provided at an end portion of an arm; an inner cylinder disposed inside the annular mounting portion; two resilient members disposed adjacent to each other in an axial direction of the inner cylinder, the resilient member connecting an inner peripheral surface of the annular mounting portion and an outer peripheral surface of the inner cylinder in such a manner as to define an annular liquid chamber facing the inner peripheral surface of the annular mounting portion and the resilient members; and two ring members respectively fixed to outer peripheral surfaces of the two resilient members, the ring members being press-fitted to the inner peripheral surface of the annular mounting portion in such a manner as to abut against two stepped portions formed on the inner peripheral surfaces, respectively.

4 Claims, 14 Drawing Sheets

LIQUID-FILLED VIBRATION ISOLATOR

BACKGROUND OF THE INVENTION

1. Field of the Invention

The present invention relates to a liquid-filled vibration isolator in which an annular mounting portion provided at an end portion of an arm and an inner cylinder disposed inside the annular mounting portion are connected by a resilient member so as to damp vibration through a volumetric change of an annular liquid chamber formed in such a manner as to face this resilient member.

2. Description of the Related Art

FIG. 14 shows a conventional liquid-filled vibration isolator for a suspension for an automobile, and an outer cylinder 101 and an inner cylinder 102 which are disposed coaxially are connected by a resilient member 103, and an annular liquid chamber 104 with a liquid sealed therein is defined between the resilient member 103 and the outer cylinder 101. An outer peripheral surface of the outer cylinder 101 is fixed to an inner peripheral surface of an annular mounting portion 105, which is formed at an end portion of a suspension arm, by means of press fitting. Then, when a relative displacement in a diametrical direction occurs between the outer cylinder 101 and the inner cylinder 102 by application of a load, damping occurs when both diametrical end portions of the liquid chamber 104 alternately undergo enlargement and shrinkage in volume, and the liquid flows from a volume-shrunk portion to a volume-enlarged portion of the liquid chamber 104.

In the above-described conventional vibration isolator, since the outer cylinder 101 is interposed between the liquid chamber 104 and the annular mounting portion 105, if an attempt is made to sufficiently secure the radial thickness of the resilient member 103 and the sectional area of the liquid chamber 104, there is a problem in that the radial dimension of the liquid-filled vibration isolator tends to become large in size. In addition, since the outer cylinder 101 is merely press-fitted to the annular mounting portion 105, and a detent means is not provided, there is a possibility that the outer cylinder 101 comes off the annular mounting portion 105 due to an axial load.

SUMMARY OF THE INVENTION

The present invention has been devised in view of the above-described problems, and its object is to make the radial dimension of the liquid-filled vibration isolator as small as possible and prevent the positional offset of the resilient member when an axial load is applied.

To attain the above object, according to a first aspect of the invention, there is provided a liquid-filled vibration isolator in which an inner peripheral surface of an annular mounting portion provided at an end portion of an arm and an outer peripheral surface of an inner cylinder disposed inside the annular mounting portion are connected by two resilient members disposed adjacent to each other in an axial direction to thereby define an annular liquid chamber facing the inner peripheral surface of the annular mounting portion and the resilient members, wherein two ring members respectively fixed to outer peripheral surfaces of the two resilient members are press-fitted to the inner peripheral surface of the annular mounting portion, and are made to abut against two stepped portions formed on the inner peripheral surfaces, respectively.

In accordance with the above-described arrangement, since the liquid chamber is defined by the inner peripheral surface of the annular mounting portion provided at an end portion of the arm, as compared with the vibration isolator in which another member is interposed between the liquid chamber and the inner peripheral surface of the annular mounting portion, the radial dimension of the liquid-filled vibration isolator can be made small while sufficiently securing the radial thicknesses of the resilient members and the sectional area of the liquid chamber. Moreover, when the two ring members respectively fixed to the outer peripheral surfaces of the two resilient members are press-fitted to the inner peripheral surface of the annular mounting portion, these ring members are respectively made to abut against the two stepped portions formed on the inner peripheral surface of the annular mounting portion; therefore, even if an axial load is applied, the resilient members are prevented from becoming positionally offset from the annular mounting portion.

In addition, according to a second aspect of the invention, there is provided a liquid-filled vibration isolator in which an inner peripheral surface of an annular mounting portion provided at an end portion of an arm and an outer peripheral surface of an inner cylinder disposed inside the annular mounting portion are connected by a resilient member to thereby define an annular liquid chamber facing the inner peripheral surface of the annular mounting portion and the resilient member, wherein an outer peripheral surface of the resilient member is directly fixed to the inner peripheral surface of the annular mounting portion.

In accordance with the above-described arrangement, since the liquid chamber is defined by the inner peripheral surface of the annular mounting portion provided at the end portion of the arm, as compared with the vibration isolator in which another member is interposed between the liquid chamber and the inner peripheral surface of the annular mounting portion, the radial dimension of the liquid-filled vibration isolator can be made small while sufficiently securing the radial thicknesses of the resilient members and the sectional area of the liquid chamber. Moreover, since the outer peripheral surface of the resilient member is directly fixed to the inner peripheral surface of the annular mounting portion, the number of component parts can be reduced as compared with an arrangement in which the resilient member is fixed to the annular mounting portion by means of a ring member.

In addition to the above arrangement, an annular recessed portion extending in a circumferential direction may be formed on the outer peripheral surface of the resilient member, and the outer peripheral surface of the resilient member may be bonded to the inner peripheral surface of the annular mounting portion, to thereby define the liquid chamber.

In accordance with the above-described arrangement, since the annular recessed portion extending in the circumferential direction is formed on the outer peripheral surface of the resilient member, it becomes difficult for a bonding agent to adhere to the annular recessed portion making up the inner wall surface of the liquid chamber when the outer peripheral surface of the resilient member is bonded to the inner peripheral surface of the annular mounting portion. Consequently, it is possible to prevent the occurrence of variations in the resiliency of the resilient member and damage to the resilient member due to the breakage of the adhering bonding agent.

DETAILED DESCRIPTION OF THE PREFERRED EMBODIMENTS

Hereafter, a description will be given of the embodiments of the present invention with reference to the embodiments of the present invention illustrated in the appended drawings.

[First Embodiment]

Figure 1:
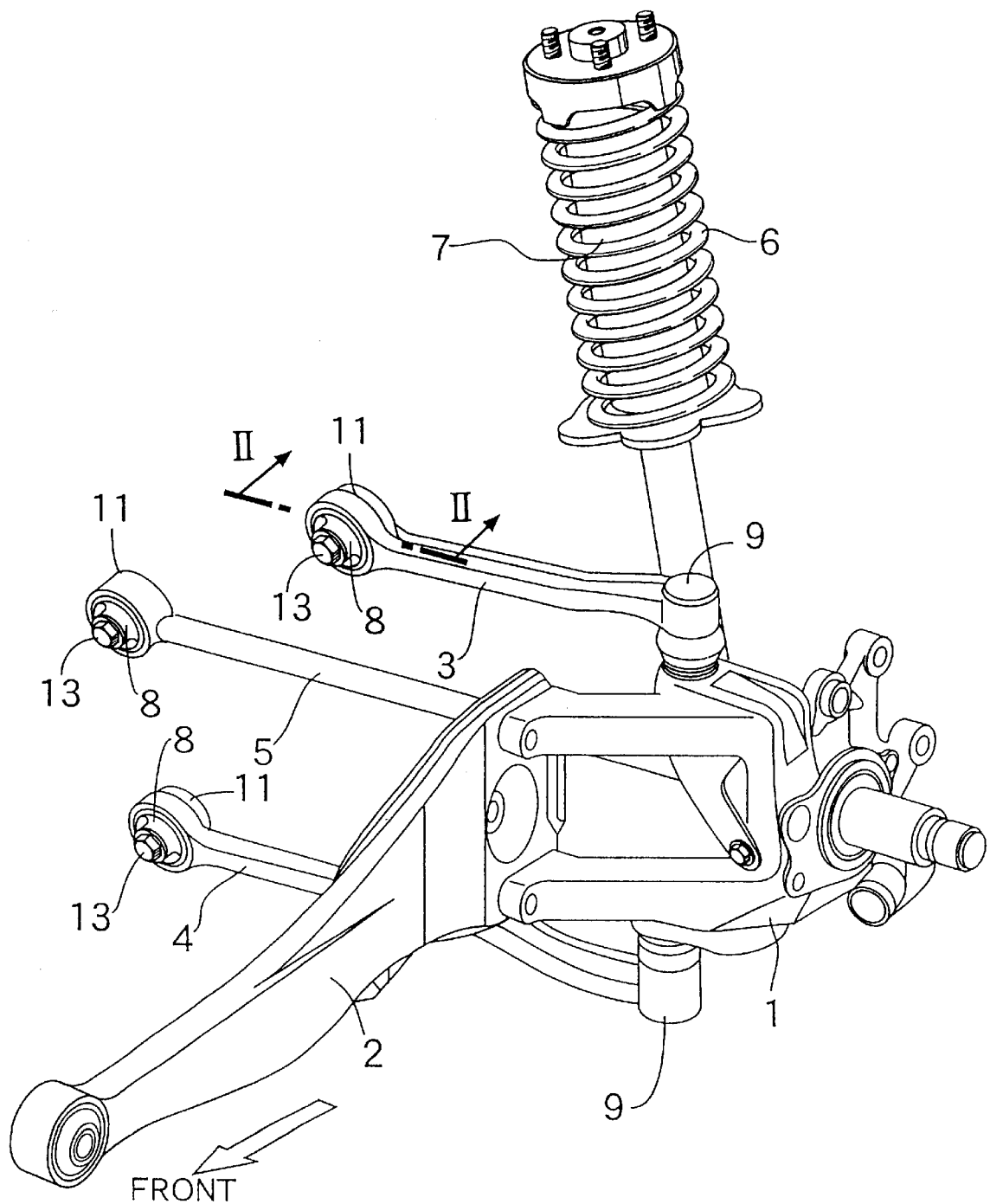
FIG. 1 is a perspective view of a rear suspension in which a liquid-filled vibration isolator is used.

FIGS. 1 to 6 show a first embodiment of the present invention. FIG. 1 shows a suspension of a left rear wheel of an automobile. A knuckle 1 for rotatably supporting an unillustrated wheel is connected to the vehicle body by a trailing arm 2 extending forward, and is connected to the vehicle body by an upper arm 3, a front lower arm 4, and a rear lower arm 5 which extend in the transverse direction of the vehicle. The vertical motion of the knuckle 1 is damped by a shock absorber 7 which integrally has a coil spring 6. The upper arm 3, the front lower arm 4, and the rear lower arm 5 have their inner ends supported to the vehicle body by means of liquid-filled vibration isolators 8 and their outer ends supported to the knuckle 1 by means of ball joints 9. Since the liquid-filled vibration isolators 8 of the upper arm 3, the front lower arm 4, and the rear lower arm 5 have the same structure, a description will be given hereinafter of the liquid-filled vibration isolator 8 of the upper arm 3 as a representative one.

Figure 2:
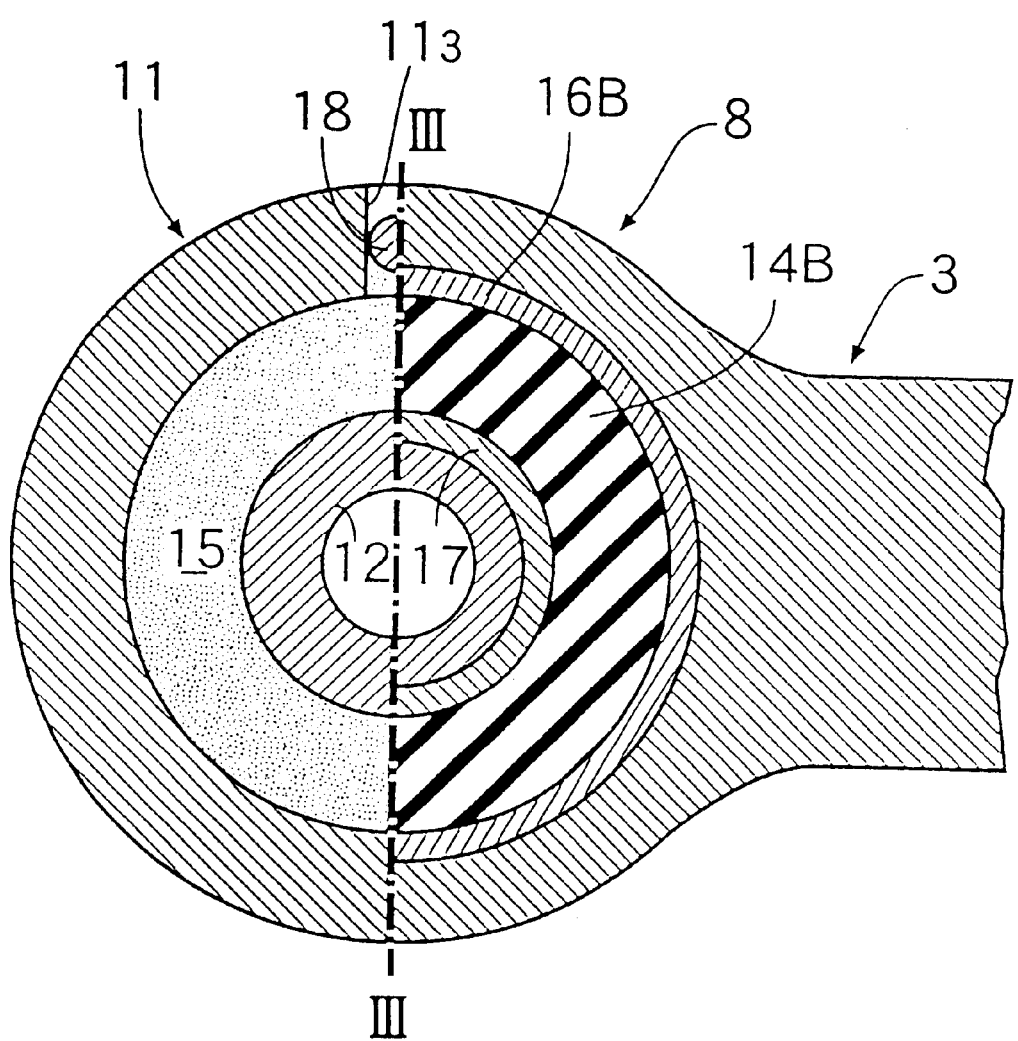
FIG. 2 is an enlarged cross-sectional view taken along line II—II of FIG. 1.
Figure 3:
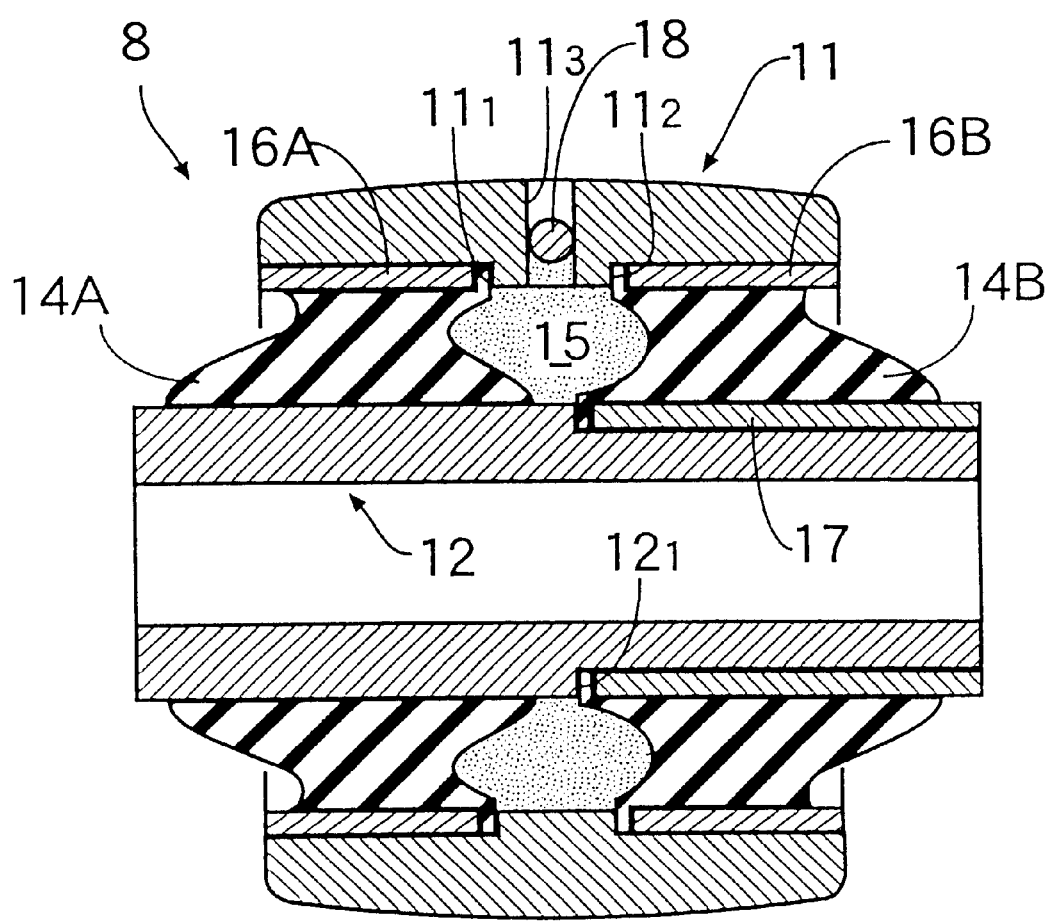
FIG. 3 is a cross-sectional view taken along line III—III of FIG. 2.

As shown in FIGS. 2 and 3, the liquid-filled vibration isolator 8 is formed integrally with the upper arm 3, and has as a part of its component element an annular mounting portion 11 which is formed at an end of the upper arm 3. A tubular inner cylinder 12 is coaxially disposed inside the annular mounting portion 11 which constitutes an outer cylinder of the liquid-filled vibration isolator 8, and this inner cylinder 12 is fixed to the vehicle body by means of a bolt 13 (see FIG. 1). The annular mounting portion 11 and the inner cylinder 12 are connected by two resilient members 14A and 14B which are adjacent to each other in the axial direction, and a liquid such as ethylene glycol or the like is sealed in the interior of an annular liquid chamber 15 which is defined by the annular mounting portion 11, the inner cylinder 12, and the two resilient members 14A and 14B.

An inner peripheral surface of the resilient member 14A is fixed to an outer peripheral surface of the inner cylinder 12 by means of baking, and a ring member 16A which is fixed to an outer peripheral surface of the resilient member 14A by means of baking is fixed to an inner peripheral surface of the annular mounting portion 11 by press fitting. Similarly, a ring member 17 which is fixed to an inner peripheral surface of the resilient member 14B by means of baking is fixed to an outer peripheral surface of the inner cylinder 12 by press fitting. And, a ring member 16B which is fixed to an outer peripheral surface of the resilient member 14B by means of baking is fixed to an inner peripheral surface of the annular mounting portion 11 by press fitting. When the ring member 16A on the outer side of the resilient member 14A is press-fitted to the annular mounting portion 11, an end of the ring member 16A in its press-fitting direction abuts against a stepped portion $11_1$ which projects from the inner peripheral surface of the annular mounting portion 11. Similarly, when the ring member 16B on the outer side of the resilient member 14B and the ring member 17 on the inner side thereof are press-fitted, an end of the outer ring member 16B in its press-fitting direction abuts against a stepped portion $11_2$ which projects from the inner peripheral surface of the annular mounting portion 11, and an end of the inner ring member 17 in its press-fitting direction abuts against a stepped portion $12_1$ which projects from the outer peripheral surface of the inner cylinder 12.

A liquid injection hole $11_3$ communicating with the liquid chamber 15 is formed in the annular mounting portion 11, and the liquid chamber 15 with the liquid sealed therein is hermetically sealed by a ball 18 which is press-fitted in this liquid injection hole $11_3$.

Figure 4:
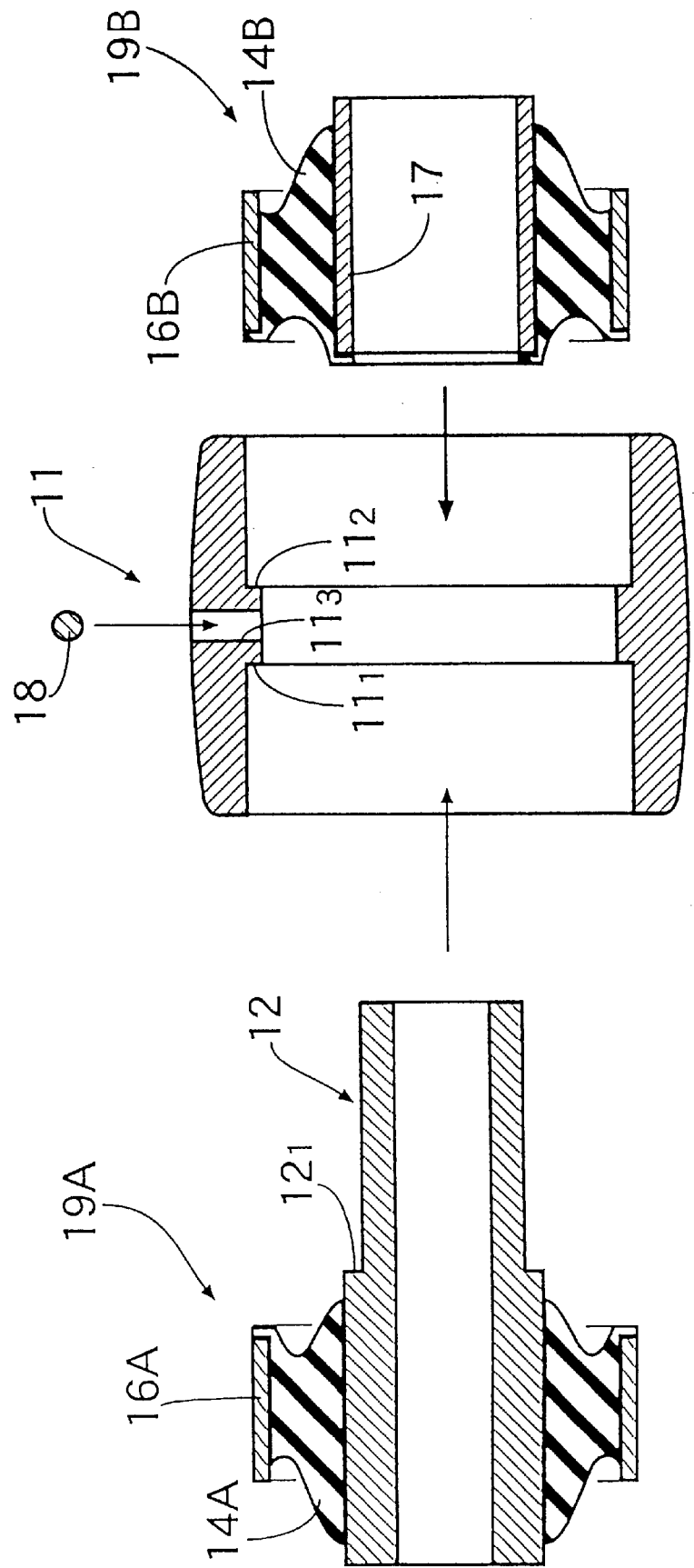
FIG. 4 is an explanatory diagram of the process of assembling the liquid-filled vibration isolator.

FIG. 4 shows the process of assembling the liquid-filled vibration isolator 8. A subassembly 19A including the inner cylinder 12, the resilient member 14A, and the ring member 16A and a subassembly 19B including the ring member 17, the resilient member 14B, and the ring member 16B are prepared in advance. First, after the subassembly 19A on the left-hand side in the drawing is assembled to the annular mounting portion 11, the subassembly 19B on the right-hand side in the drawing is assembled to the annular mounting portion 11 and the subassembly 19A.

Figure 5:
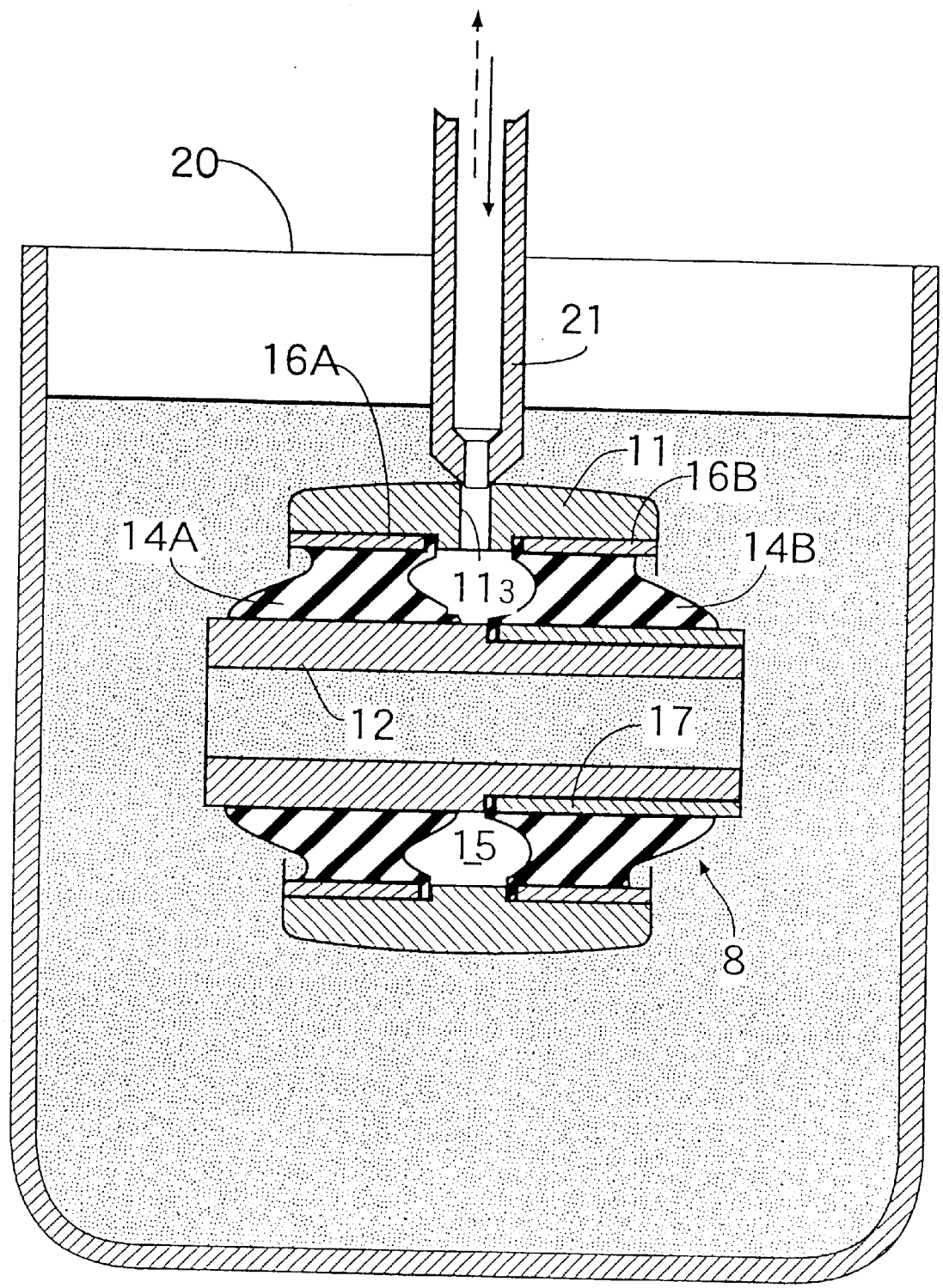
FIG. 5 is an explanatory diagram of the process of filing liquid of the liquid-filled vibration isolator.

FIG. 5 shows the process of injecting the liquid into the liquid chamber 15 of the liquid-filled vibration isolator 8. First, the liquid-filled vibration isolator 8 in which all the parts excluding the ball 18 have been assembled is submerged in a liquid tank 20 which is filled with the liquid, and a liquid injection pipe 21 is connected to the liquid injection hole $11_3$ in the annular mounting portion 11. In this state, after the interior of the liquid chamber 15 is evacuated through the liquid injection pipe 21, the liquid is injected into the interior of the liquid chamber 15 through the liquid injection pipe 21. As a result, the liquid can be injected into the interior of the liquid chamber 15 without causing air to remain therein. Then, the ball 18 is press-fitted to the liquid injection hole $11_3$ in the liquid-filled vibration isolator 8 removed from the liquid tank 20, thereby hermetically sealing the liquid chamber 15.

Figure 6:
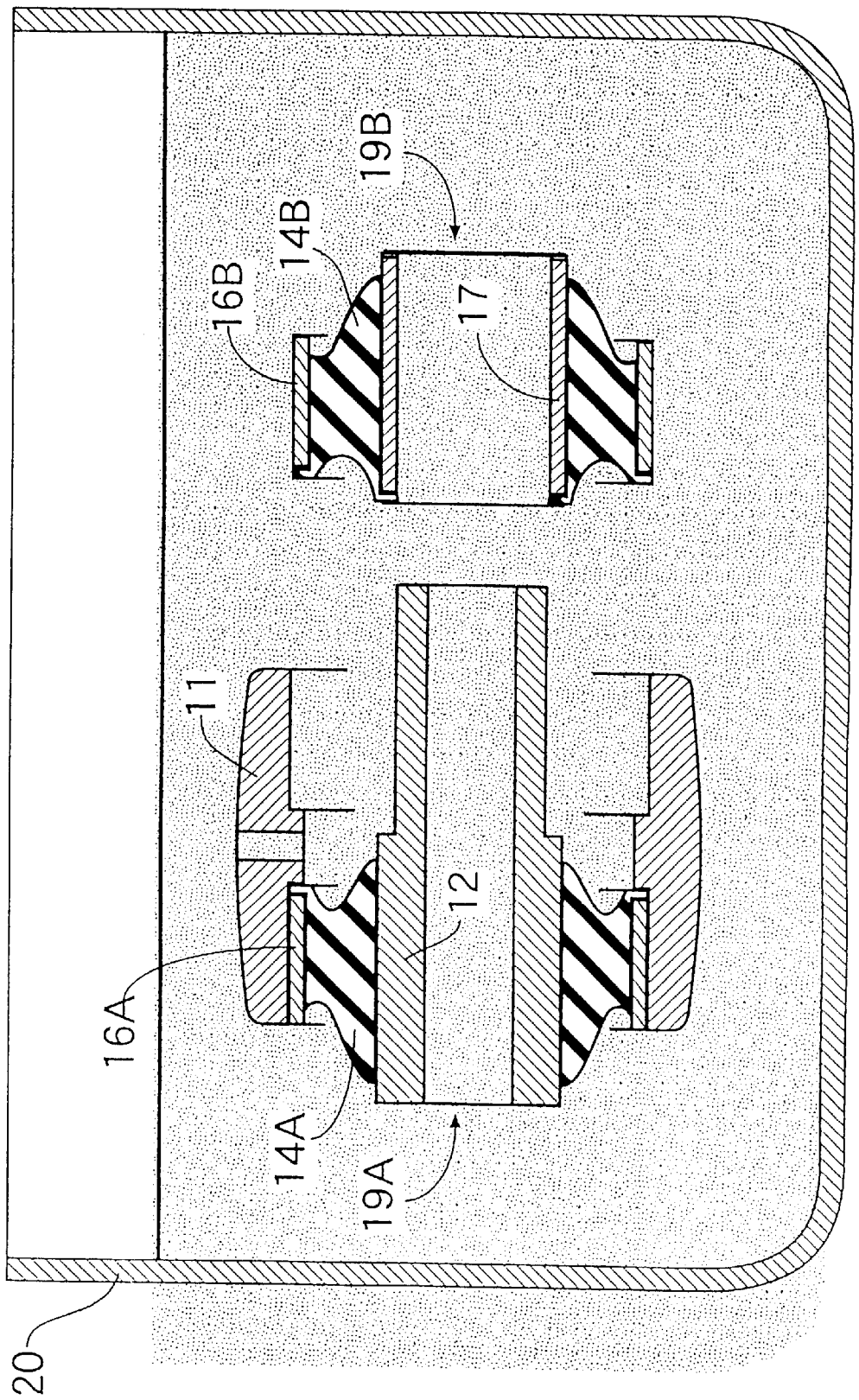
FIG. 6 is an explanatory diagram of the process of assembling the liquid-filled vibration isolator in the liquid.

FIG. 6 shows the process of assembling the liquid-filled vibration isolator, which can replace the technique shown in FIGS. 4 and 5. A unit in which one subassembly 19A has been assembled to the annular mounting portion 11 is submerged in the liquid tank 20 filled with the liquid, and in this state the other subassembly 19B is assembled to the annular mounting portion 11 and the subassembly 19A. Then, the ball 18 is press-fitted to the liquid injection hole $11_3$ in the liquid-filled vibration isolator 8 removed from the liquid tank 20, thereby hermetically sealing the liquid chamber 15. According to this technique, the injection of the liquid can be completed at the same time as the assembly of the liquid-filled vibration isolator 8.

In accordance with this embodiment, since the entire outer peripheral portion of the liquid chamber 15 directly faces the inner peripheral surface of the annular mounting portion 11 without another member being interposed therebetween, the radial dimension of the liquid-filled vibration isolator 8 can be made small while sufficiently securing the radial thicknesses of the resilient members 14A and 14B and the sectional area of the liquid chamber 15. Moreover, even if an axial load is applied between the annular mounting portion 11 and the inner cylinder 12, since the three ring members 16A, 16B, and 17 are positioned by abutting against the stepped portions $11_1$, $11_2$, and $12_1$, the ring members 16A, 16B, and 17 can be prevented from becoming positionally offset in the axial direction.

[Second Embodiment]

Figure 7:
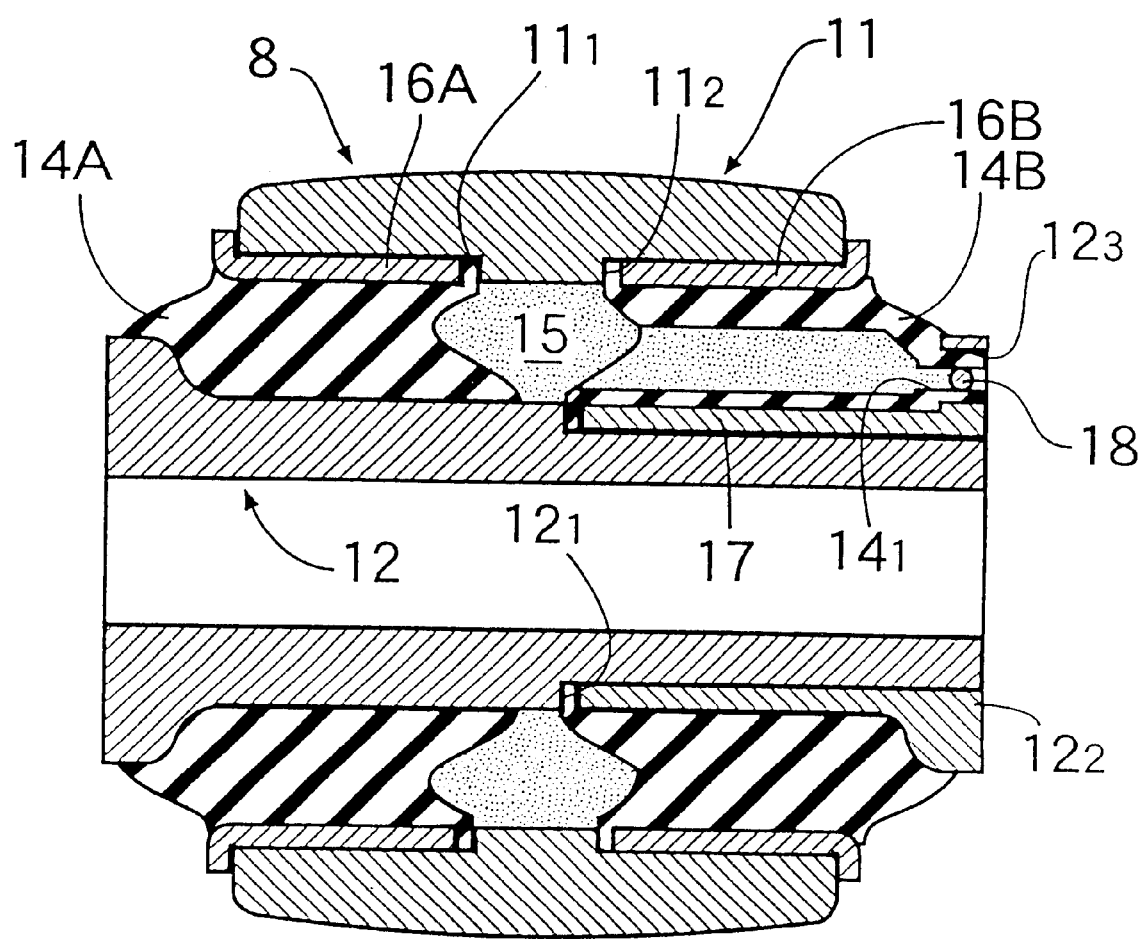
FIG. 7 is a longitudinal cross-sectional view of the liquid-filled vibration isolator in accordance with a second embodiment.

Next, a description will be given of a second embodiment of the present invention with reference to FIG. 7.

Although in the above-described first embodiment, the liquid injection hole $11_3$ for injecting the liquid into the liquid chamber 15 is formed in the annular mounting portion 11, in the second embodiment a liquid injection hole $14_1$ is formed in such a manner as to axially penetrate one resilient member 14B. Namely, a portion of the resilient member 14B is fitted in a through hole $12_3$ which axially penetrates a flange $12_2$ formed at one end of the inner cylinder 12, and the liquid injection hole $14_1$ is formed in such a manner as to penetrate that fitted portion. The injection of the liquid into the liquid chamber 15 is effected in the same way as in the above-described first embodiment, and the hermetic sealing of the liquid chamber 15 after injection of the liquid is effected by press-fitting the ball 18 to a small-diameter portion of the liquid injection hole $14_1$ in the resilient member 14B.

This embodiment is effective in a case where the inner cylinder 12 is provided with the flange $12_2$ and in a case where the annular mounting portion 11 is formed of a thin steel plate and the hermetic sealing of the liquid injection hole $11_3$ by the ball 18 is difficult.

[Third Embodiment]

Figure 8:
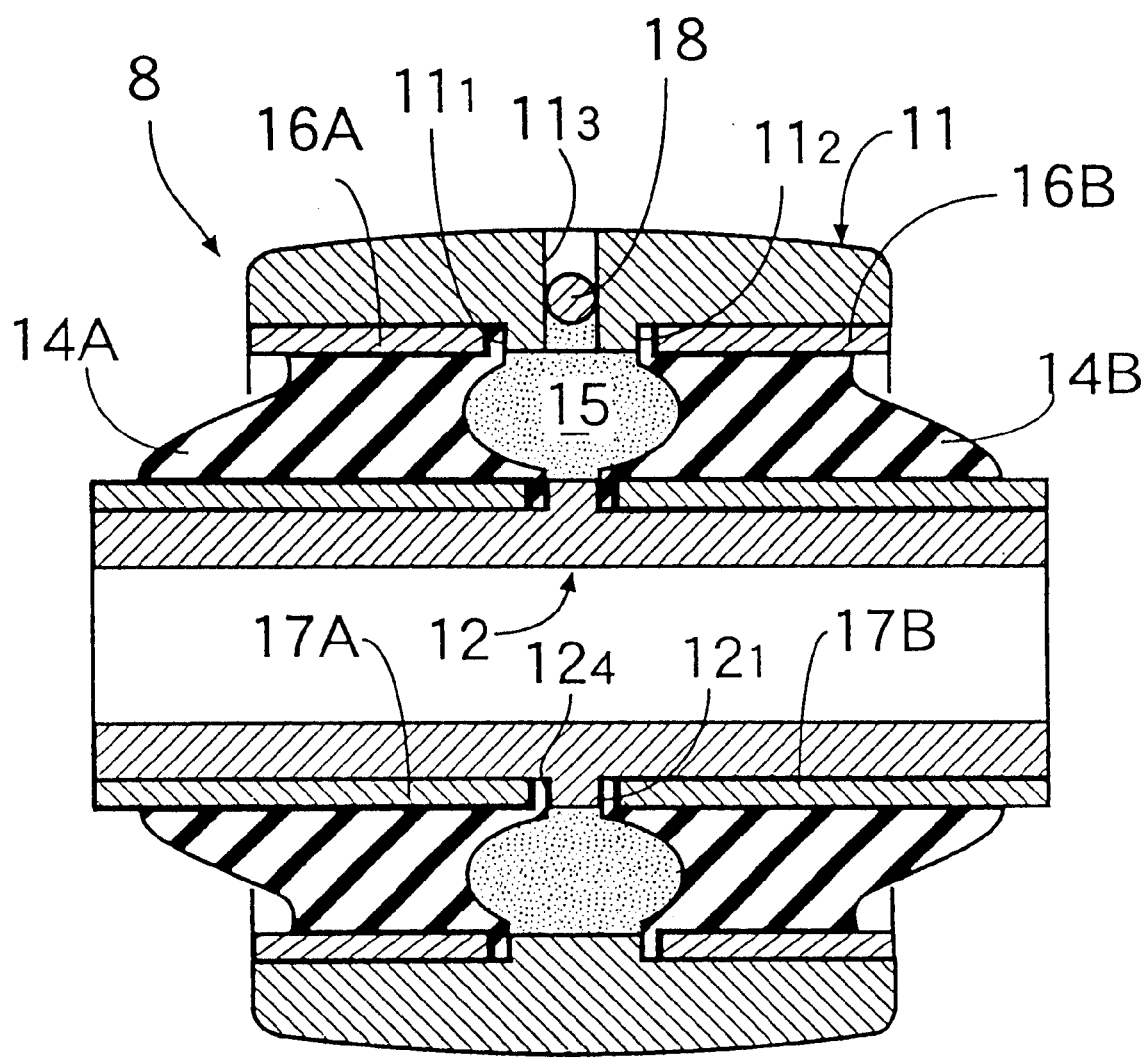
FIG. 8 is a longitudinal cross-sectional view of the liquid-filled vibration isolator in accordance with a third embodiment.

Next, referring to FIG. 8, a description will be given of a third embodiment of the present invention.

Although in the first embodiment the inner peripheral surface of one resilient member 14A is directly fixed to the outer peripheral surface of the inner cylinder 12 by means of baking, in the third embodiment a ring member 17A which is baked onto the inner peripheral surface of the resilient member 14A is fixed to the outer peripheral surface of the inner cylinder 12 by means of press fitting. At that juncture, and end of the ring member 17A abuts against a stepped portion $12_4$ which projects from the outer peripheral surface of the inner cylinder 12.

In accordance with this embodiment, since the subassembly including the resilient member 14A and the inner and outer ring members 17A and 16A and the subassembly including the resilient member 14B and the inner and outer ring members 17B and 16B are identical and are interchangeable, it is possible to reduce the kinds of component parts, thereby contributing to the lowering of the cost.

[Fourth Embodiment]

Figure 9:
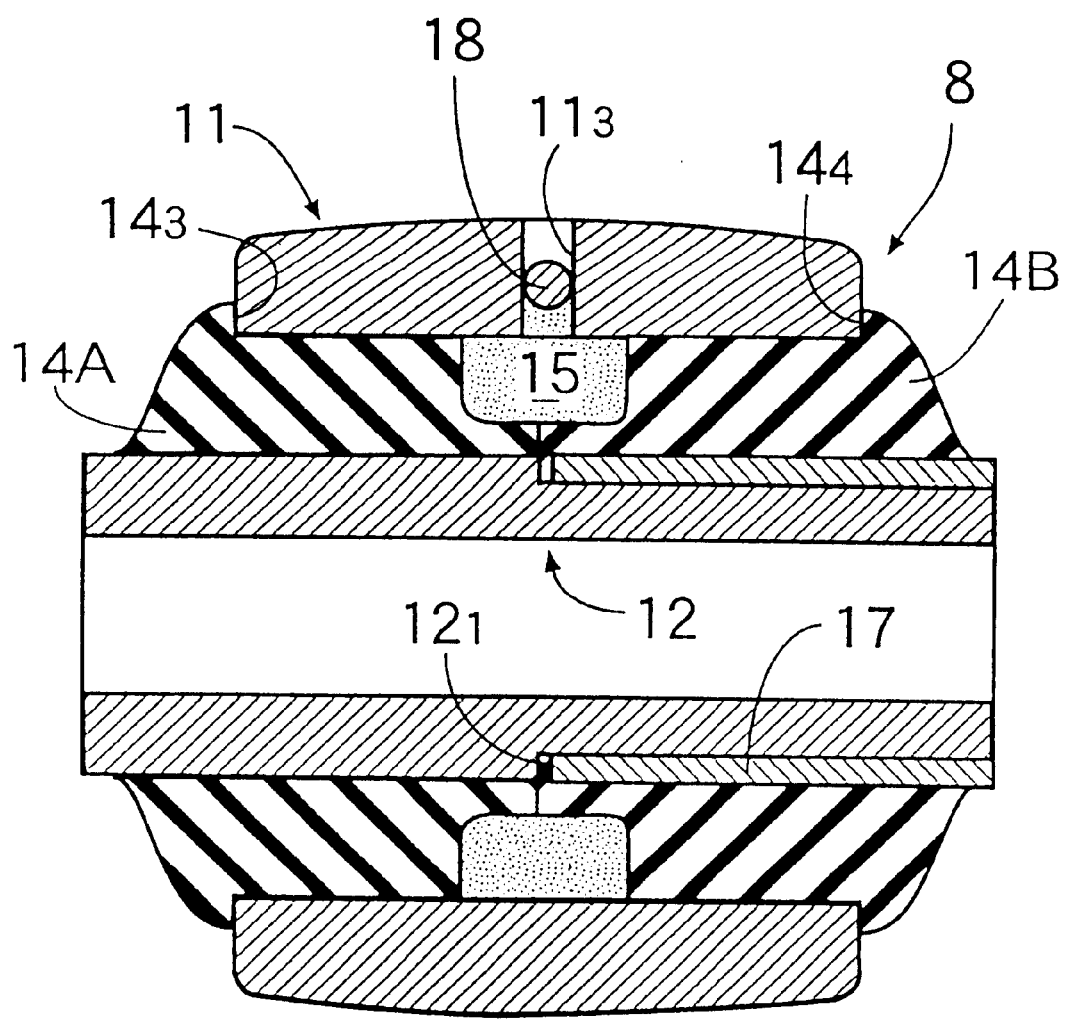
FIG. 9 is a longitudinal cross-sectional view of the liquid-filled vibration isolator in accordance with a fourth embodiment.

Next, referring to FIG. 9, a description will be given of a fourth embodiment of the present invention.

Although in the above-described first embodiment the two resilient members 14A and 14B are fixed to the inner peripheral surface of the annular mounting portion 11 by means of the ring members 16A and 16B, in the fourth embodiment the outer peripheral surfaces of the two resilient members 14A and 14B are directly fixed to the inner peripheral surface of the annular mounting portion 11 by means of press fitting or bonding. At this time, since stepped portions $14_3$ and $14_4$ at both ends of the resilient members 14A and 14B engage opposite ends of the annular mounting portion 11 in such a manner as to sandwich these opposite ends, the axial positional offset of the resilient members 14A and 14B can be effectively prevented.

In this embodiment as well, since the inner peripheral surface of the annular mounting portion 11 constitutes a portion of the inner wall surface of the liquid chamber 15, and since the ring members 16A and 16B in the first embodiment are not required, not only can the radial dimension of the liquid-filled bush 8 be made further small, but a contribution can be made to the reduction in the number of component parts.

[Fifth Embodiment]

Figure 10:
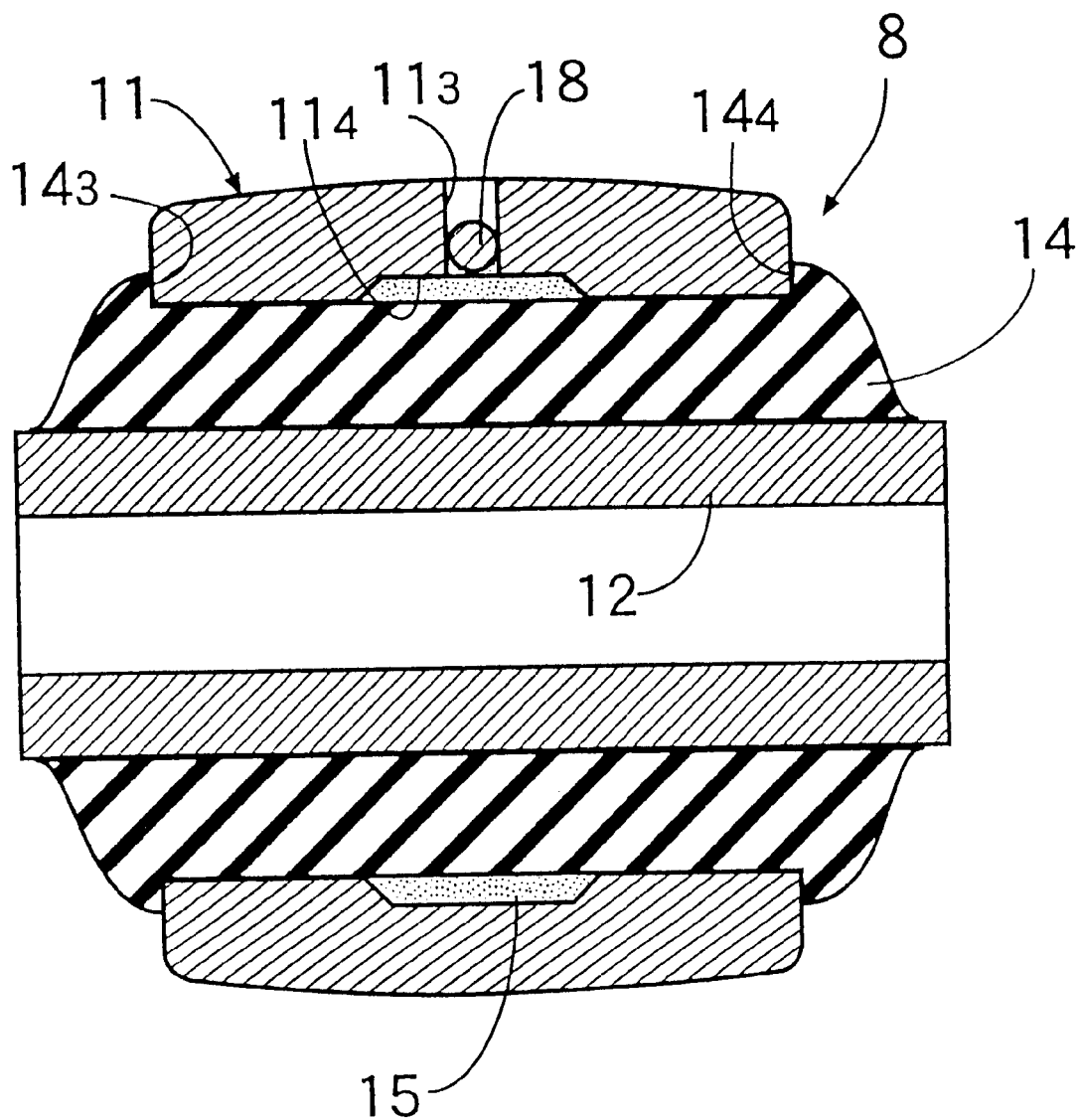
FIG. 10 is a longitudinal cross-sectional view of the liquid-filled vibration isolator in accordance with a fifth embodiment.

Next, referring to FIG. 10, a description will be given of a fifth embodiment of the present invention.

In the fifth embodiment, there is provided a single resilient member 14 in which the two resilient members 14A and 14B of the fourth embodiment are integrated, and its inner peripheral surface is directly fixed to the outer peripheral surface of the inner cylinder 12 by means of baking without the interposition of the ring member 17 therebetween (see FIG. 9), while its outer peripheral surface is directly fixed to the inner periphery of the annular mounting portion 11 by means of press fitting or bonding. The generator of the outer peripheral surface of the resilient member 14 is linear, and the liquid chamber 15 is defined by providing an annular recessed portion $11_4$ on the inner peripheral surface of the annular mounting portion 11.

In accordance with this embodiment, since the resilient member 14 can be only one piece, the number of component parts can be further reduced as compared with the fourth embodiment.

[Sixth Embodiment]

Figure 11:
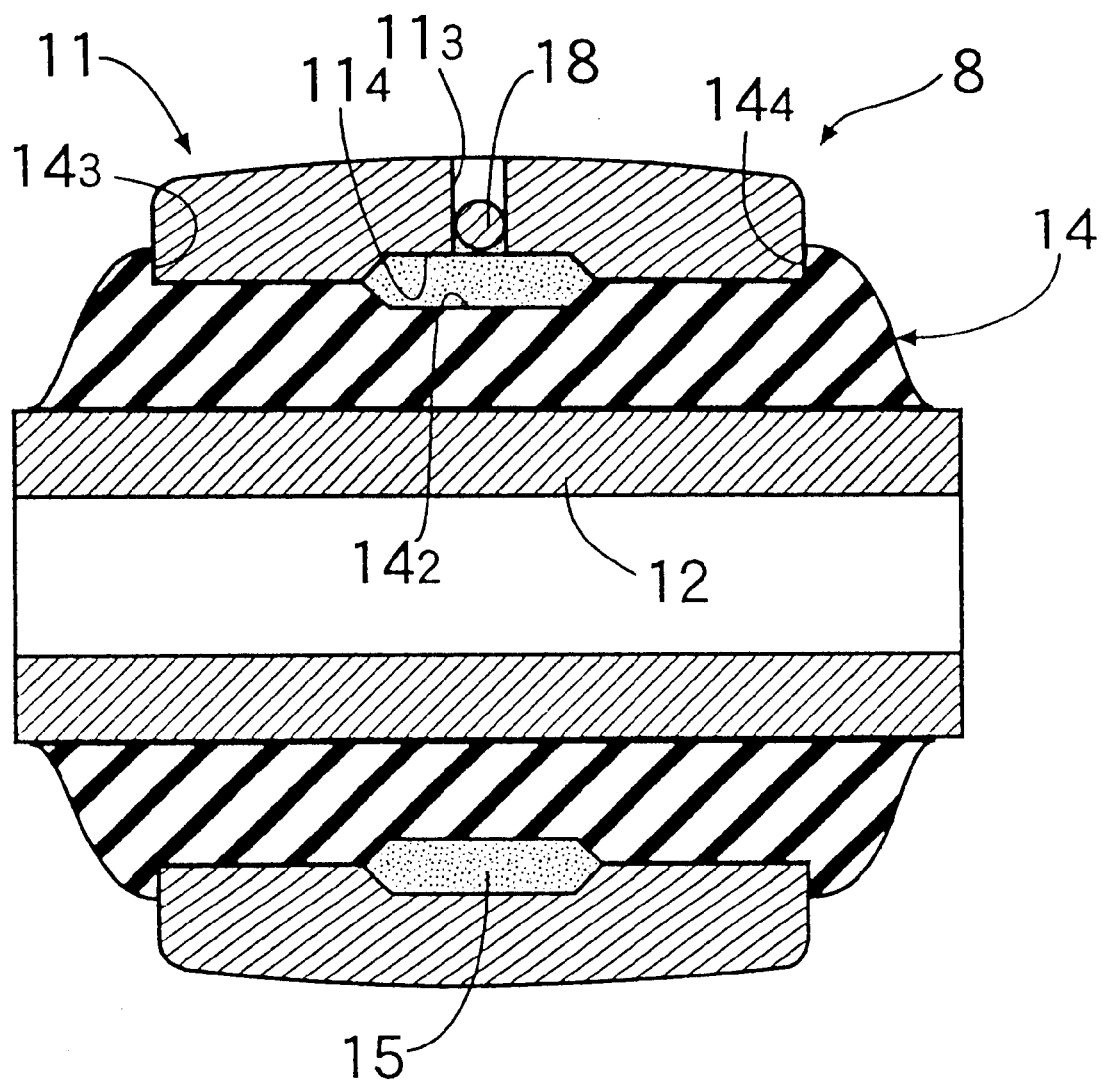
FIG. 11 is a longitudinal cross-sectional view of the liquid-filled vibration isolator in accordance with a sixth embodiment.

Next, referring to FIG. 11, a description will be given of a sixth embodiment of the present invention.

In the sixth embodiment, the liquid chamber 15 in the fifth embodiment is formed by cooperation of the annular recessed portion $11_4$ formed on the inner peripheral surface of the annular mounting portion 11 and an annular recessed portion $14_2$ on the outer peripheral surface of the resilient member 14.

In accordance with this embodiment, since not only the sectional area of the liquid chamber 15 can be easily secured, but a bonding agent is difficult to adhere to the recessed portion $14_2$ of the resilient member 14 when the resilient member 14 is bonded to the annular mounting portion 11, it is possible to prevent the occurrence of variations in the resiliency of the resilient member 14 and damage to the resilient member 14 due to the breakage of the bonding agent adhering to the recessed portion $14_2$.

[Seventh Embodiment]

Figure 12:
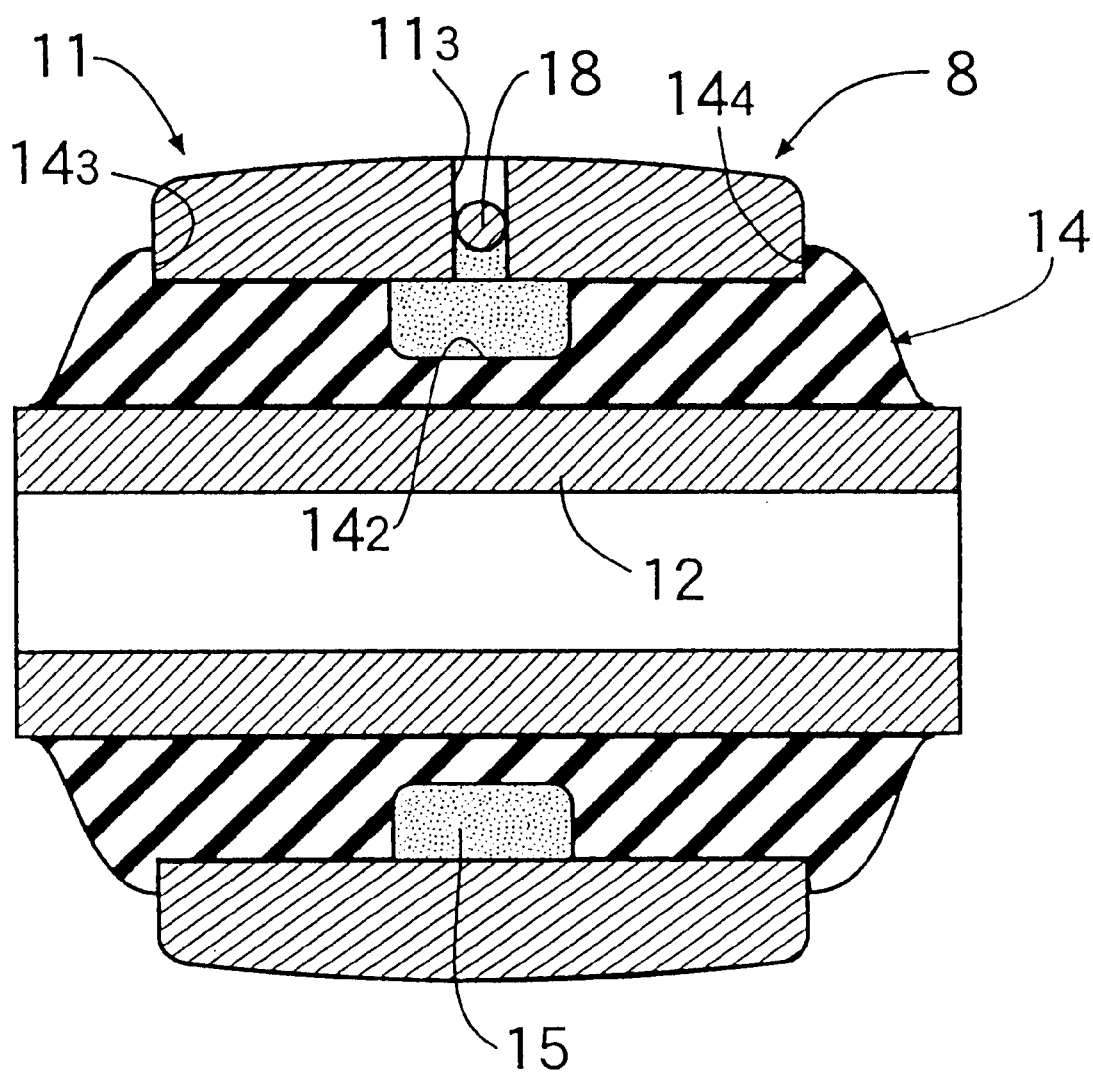
FIG. 12 is a longitudinal cross-sectional view of the liquid-filled vibration isolator in accordance with a seventh embodiment.

Next, referring to FIG. 12, a description will be given of a seventh embodiment of the present invention.

In the seventh embodiment, instead of the annular recessed portion $11_4$ on the inner peripheral surface of the annular mounting portion 11 in the fifth embodiment, the liquid chamber 15 is defined by forming the annular recessed portion $14_2$ on the outer peripheral surface of the resilient member 14.

In this embodiment as well, it is possible to demonstrate operation and effect similar to those of the above-described sixth embodiment.

[Eighth Embodiment]

Figure 13:
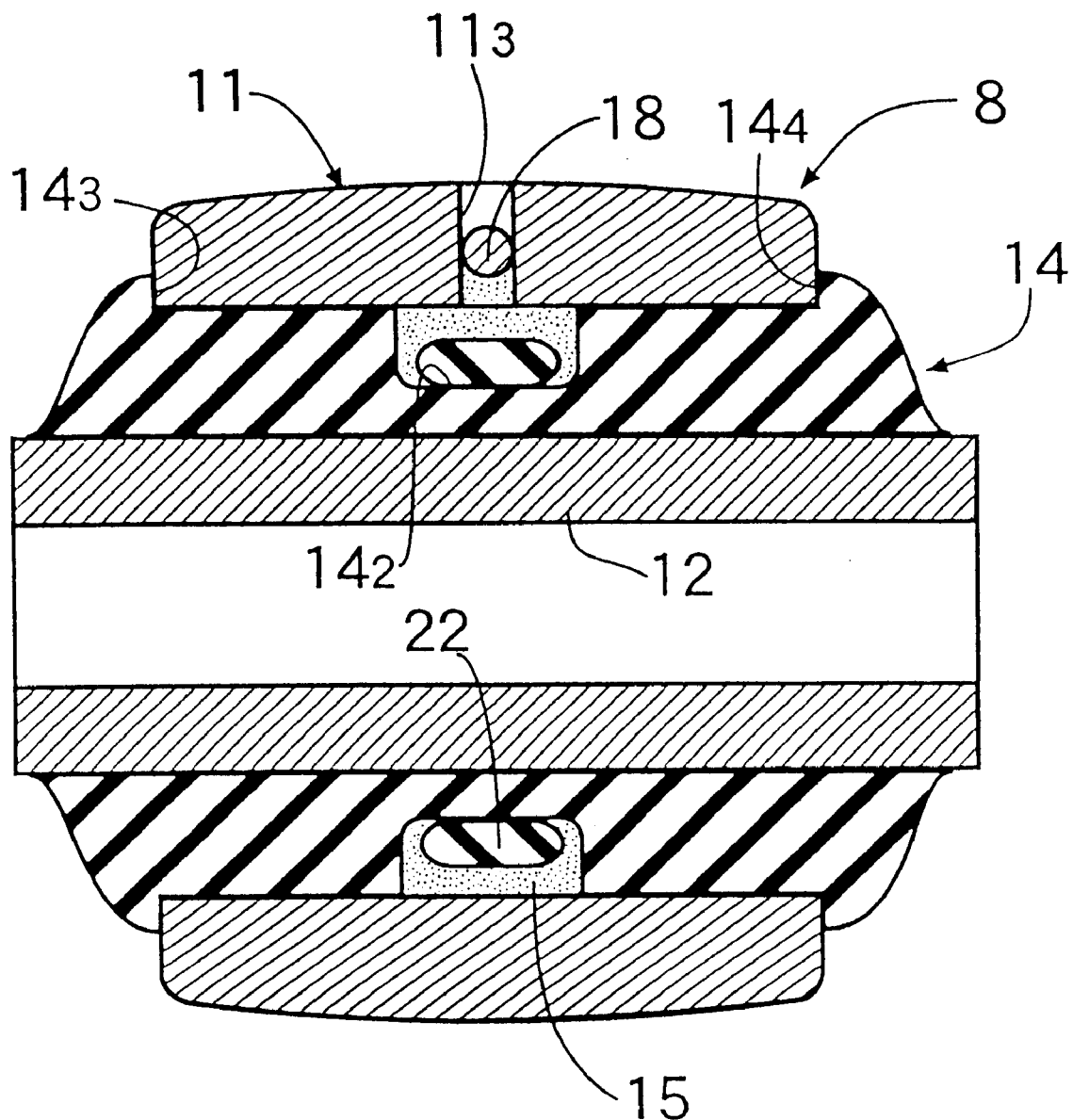
FIG. 13 is a longitudinal cross-sectional view of the liquid-filled vibration isolator in accordance with an eighth embodiment.
Figure 14:
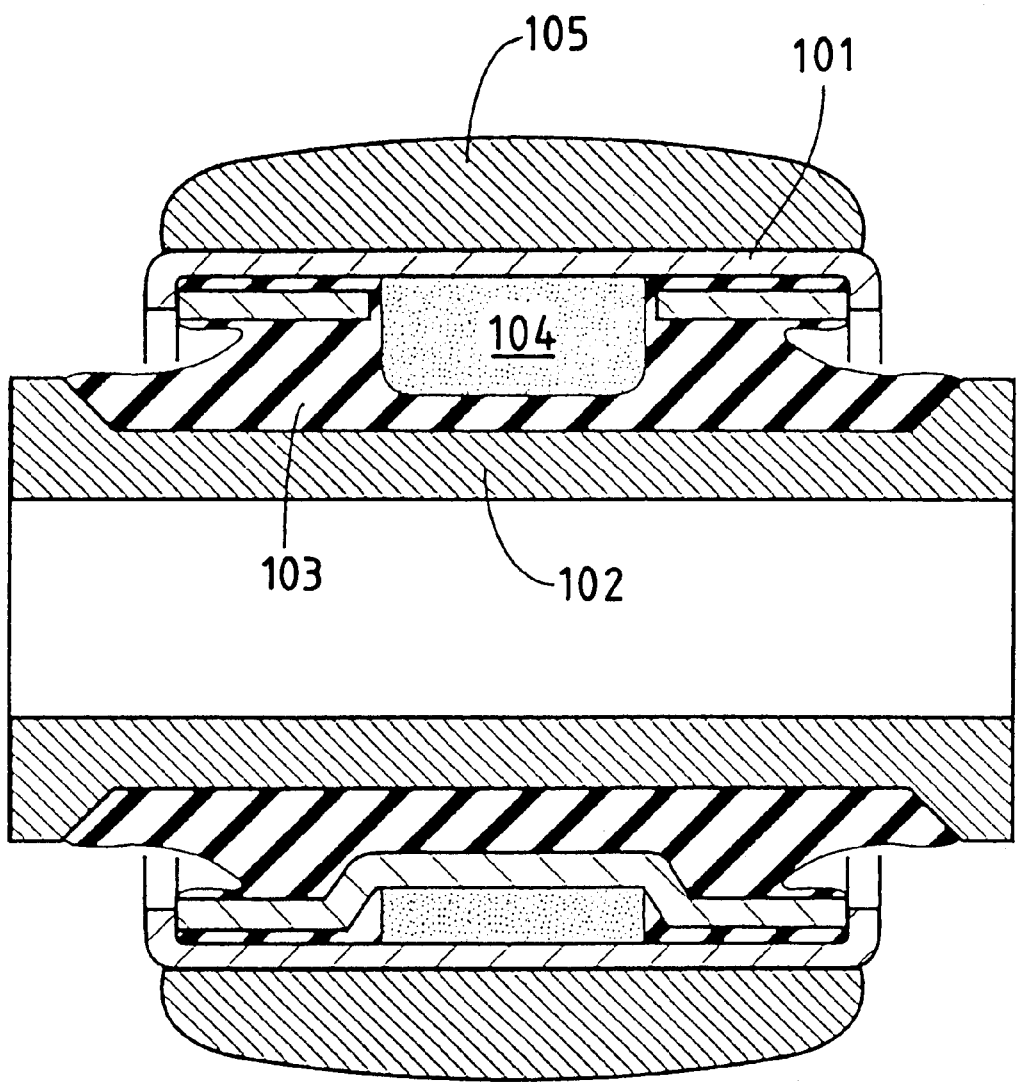
FIG. 14 is a longitudinal cross-sectional view of a conventional liquid-filled vibration isolator.

Next, referring to FIG. 13, a description will be given of an eighth embodiment of the present invention.

In the eighth embodiment, a stopper 22 formed of an annular resilient member is accommodated inside the liquid chamber 15 of the seventh embodiment.

In accordance with this embodiment, since excessive deformation of the resilient member 14 can be prevented by the stopper 22 when a large load is applied, the durability of the liquid-filled vibration isolator 8 improves.

Although a detailed description of the embodiments of the present invention has been given above, various modifications in design can be made in the present invention in a scope which does not depart from its gist.

For example, the liquid-filled bush 8 in accordance with the present invention is not limited to the use in supporting a suspension arm of an automobile, and is also applicable to other usages for such as supporting a torque rod for suppressing the vibration of an engine for an automobile.

The present disclosure relates to the subject matter contained in Japanese patent application No. Hei. 10-240441 filed on Aug. 26, 1998 which is expressly incorporated herein by reference in its entirety.

What is claimed is:

1. A liquid-filled vibration isolator, comprising:

an annular mounting portion provided at an end portion of an arm;

an inner cylinder disposed inside said annular mounting portion;

two resilient members disposed adjacent to each other in an axial direction of said inner cylinder, said resilient member connecting an inner peripheral surface of said annular mounting portion and an outer peripheral surface of said inner cylinder in such a manner as to define an annular liquid chamber facing the inner peripheral surface of said annular mounting portion and said resilient members; and two ring members respectively fixed to outer peripheral surfaces of said two resilient members, said ring members being press-fitted to the inner peripheral surface of said annular mounting portion in such a manner as to abut against two stepped portions formed on the inner peripheral surfaces, respectively, wherein one of the said two resilient members is baked on said inner cylinder so as to be fixed thereto, and the other one of said two resilient members is fixed to said inner cylinder via a third ring member having a smaller diameter that both of said two ring members, wherein said third ring member is press-fitted onto an outer peripheral surface of said inner cylinder, and said other one of said resilient members is baked on said third ring member so as to be fixed thereto.

2. A liquid-filled vibration isolator according to claim 1, wherein at least one of said ring members is abutted against at least one of said stepped portions formed on the inner peripheral surface of said annular mounting portion through at least one of said resilient members.

3. A liquid-filled vibration isolator according to claim 1, wherein said inner cylinder has a third stepped portion on the outer peripheral surface thereof, and said third ring member is press-fitted onto said outer peripheral surface thereof in such a manner as to abut against said third stepped portion.

4. A liquid-filled vibration isolator according to claim 1, wherein said third ring member is abutted against said third stepped portion through at least one of said resilient members.

* * * * *